Oct. 9, 1973 KATSUNOBU KAKIZAKI ET AL 3,764,413

METHOD OF PRODUCING INSULATED-GATE FIELD-EFFECT TRANSISTORS

Filed Nov. 23, 1971 4 Sheets-Sheet 4

United States Patent Office 3,764,413

Patented Oct. 9, 1973

3,764,413

METHOD OF PRODUCING INSULATED-GATE FIELD-EFFECT TRANSISTORS

Katsunobu Kakizaki, Osamu Kurakami, and Yasukazu Inoue, Tokyo, Japan, assignors to Nippon Electric Company, Limited, Tokyo, Japan Filed Nov. 23, 1971, Ser. No. 201,334
Claims priority, application Japan, Nov. 25, 1970, 45/103,932; Apr. 17, 1971, 46/24,668
Int. Cl. H01l *7/36, 11/00*
U.S. Cl. 148—188 4 Claims

ABSTRACT OF THE DISCLOSURE

A method is disclosed for fabricating an insulated-gate field-effect transistor. In the method, a window is formed in an insulating film formed on a substrate over the gate, source and drain regions which are to be formed. A semiconductor layer of a conductivity type opposite to that of the substrate is deposited over the insulating film and the exposed portion of the substrate defined by the window. The semiconductor layer is then selectively removed to expose the substrate at the gate region after which a second insulating film is formed over the remaining semiconductor layer and the exposed substrate surface at the intended gate region.

This invention relates to a method of producing insulated-gate field-effect semiconductor devices, and particularly to an improved method of producing insulated-gate field-effect transistors adapted for use in the fabrication of a large-scale integrated circuit device.

Prior methods of fabricating an insulated-gate field-effect transistor (hereinafter referred to as IGFET) include the formation of source and drain regions by impurity diffusion and the connection of electrodes to the thus formed source and drain regions. Since a certain distance and tolerance in that distance are required between a gate electrode and the source and drain electrodes to avoid occurrence of a short-circuit, the area of the source and drain regions must be made sufficiently large. However, the need for allowing relatively large areas for the source and drain regions results in the following drawbacks: (1) the capacitance between the substrate and each of the source and drain regions is increased and hence the high frequency performances of the IGFET is degraded; and (2) the IGFET occupies a relatively large area of a semiconductor substrate and hence it is difficult to fabricate a large-scale integrated circuit using that IGFET.

It is an object of the invention to provide a novel method of producing an IGFET having a reduced area of the source and drain regions.

It is a further object of the invention to provide a method of producing an IGFET which permits a greater density of IGFET's in a large-scale integrated circuit.

According to the invention, there is provided, in an oxide film covering the surface of a semiconductor substrate, a window for one IGFET which is to be formed. The window corresponds to the whole area of the intended source, gate and drain regions of the IGFET that is to be formed. A semiconductor layer doped with an impurity of a conductivity type opposite to that of the substrate is deposited over the oxide film and the exposed portion of the substrate defined by the window. The semiconductor layer is then selectively removed from the intended gate region and the other area to leave two parts spaced from one another. One part comprises a first portion within the window of the oxide film which serves to form the drain of the IGFET, and a second portion extending from the first portion onto the surface of the oxide film which serves as a part of an electrode for the drain. The other part comprises the similar first and second portions which serve respectively to form the source of the IGFET and a part of an electrode for the source. An insulating film is then formed at least over the surface of the two parts of the semiconductor layer and the intended gate region of the substrate. A part of this insulating film formed on the intended gate region serves as a gate insulator. A gate electrode is then deposited on the gate insulator. Since the semiconductor layer serves as a part of the electrodes for the source and drain and is already insulated from the gate electrode by the insulating film formed on the surface of the semiconductor layer, there is no need for providing a space and a tolerance between the gate electrode and each of the source and drain electrodes at their nearest portions. Therefore, the area of the source and drain regions can be reduced as small as possible.

To the accomplishment of the above and to such further objects as may hereinafter appear, the present invention relates to a method of producing insulated-gate field-effect transistors substantially as defined in the appended claims and as described in the following specification taken together with the accompanying drawings in which:

FIGS. 1 to 6 are schematic views which serve to illustrate the steps of the process according to one embodiment of the present invention, wherein FIG. 1 is a sectional view, FIGS. 2B to 6B are plane views, and FIGS. 2A to 6A are cross-sectional views taken respectively along the lines *a–a'* of FIGS. 2B to 6B;

Figure 1:
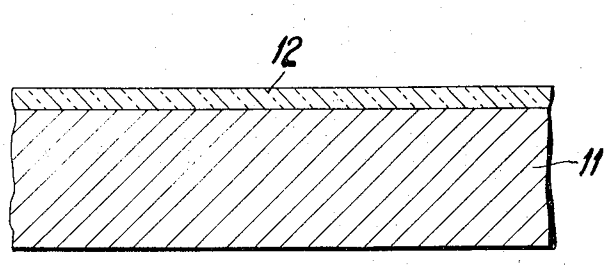
Figure 2A:
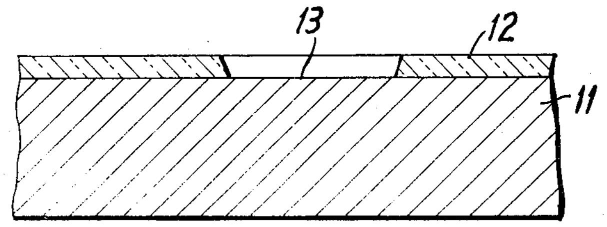
Figure 2B:
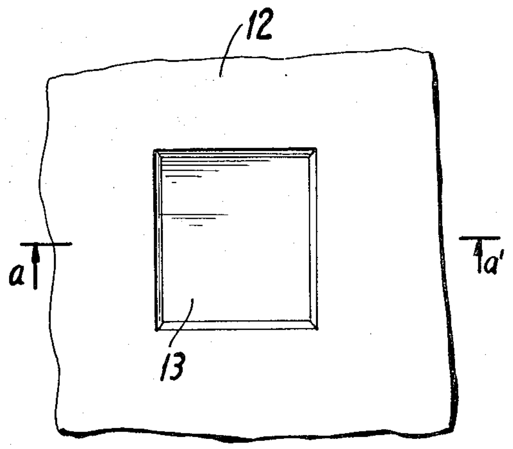
Figure 3A:
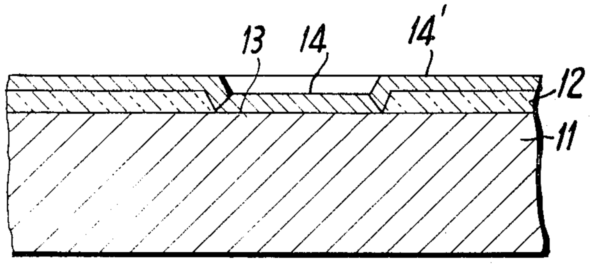
Figure 3B:
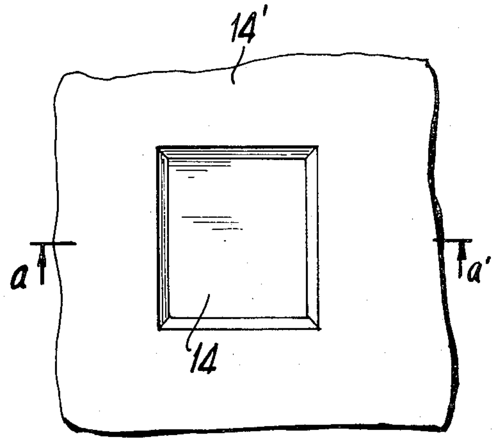
Figure 4A:
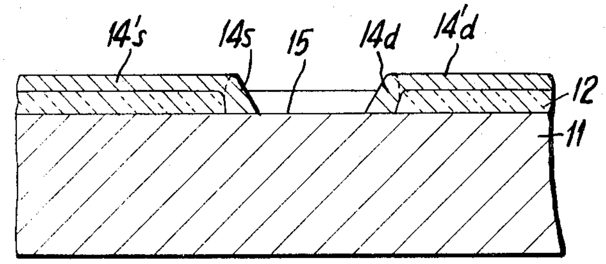
Figure 4B:
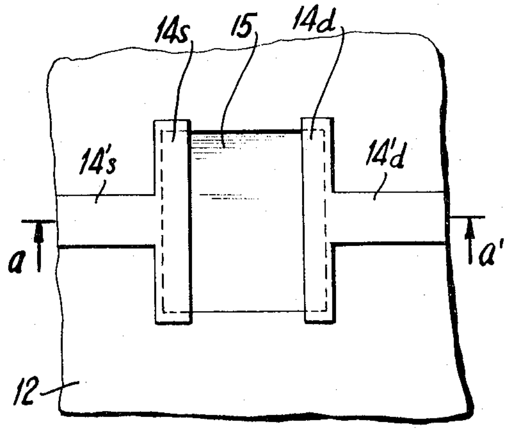
Figure 5A:
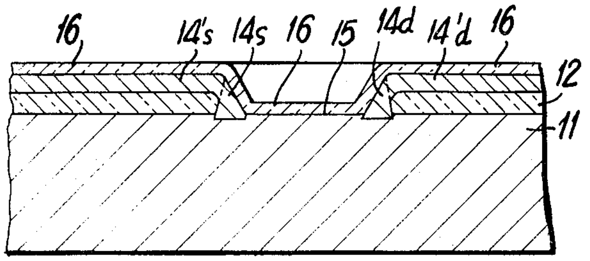
Figure 5B:
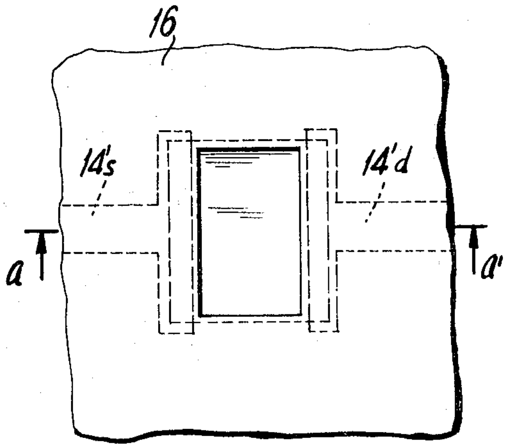
Figure 6A:
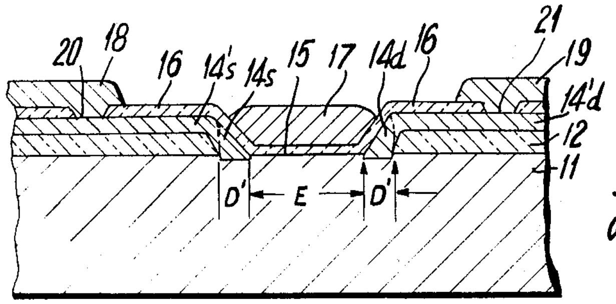
Figure 6B:
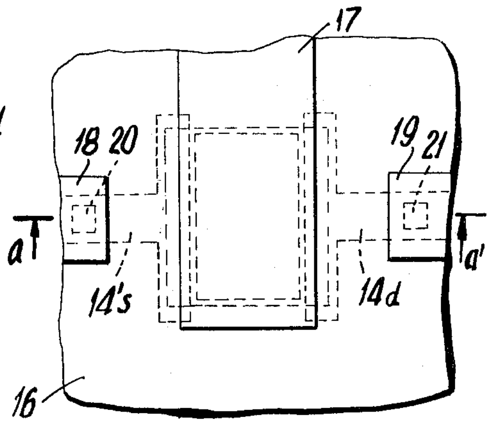

Referring to FIG. 1, a silicon oxide film 12 of about 0.7 micron thick is formed over the surface of an n-type silicon substrate 11. A window 13 is opened such as by etching in the silicon oxide film 12 (FIG. 2). The substrate 11 is disposed then in a reactor and a vapor of silane mixed with diborane is introduced into the reactor at a temperature exceeding about 900° C., for example at approximately 1,020° C., resulting in the epitaxial growth of a single-crystalline silicon layer 14 and the deposition of a polycrystalline silicon layer 14' (FIG. 3). The silicon layers 14, 14' are grown to a thickness of about 0.5 micron and are doped with boron. Thereafter, parts of the silicon layers 14, 14' are selectively etched away to expose the intended gate region 15 and to leave source and drain regions **14*s* and 14*d* of the p-type single-crystalline layer and source electrode and drain electrode regions 14'*s* and 14'*d* of the p-type polycrystalline layer (FIG. 4). An insulating film 16 such as a silicon oxide film is thereafter grown or deposited on the entire surface to a thickness of 0.1 to 0.2 micron (FIG. 5). In this stage, boron is more or less diffused from the silicon layers 14s and 14*d* into the n-type substrate 11, as shown in FIG. 5. These diffused regions also serve as source and drain, respectively. A gate electrode 17 made for example, of aluminum is then formed on the insulating film 16 at the intended gate region 15 (FIG. 6). If necessary, windows 20 and 21 may be opened in the insulating film 16 over the source and drain electrode regions 14'*s*, 14'*d*, respectively, and lead-out electrodes 18, 19** are respectively attached to these regions, as shown in FIG. 6.

An alternative embodiment of the invention is shown in FIGS. 7 to 10 which correspond to FIGS. 3 to 6.

Figure 7:
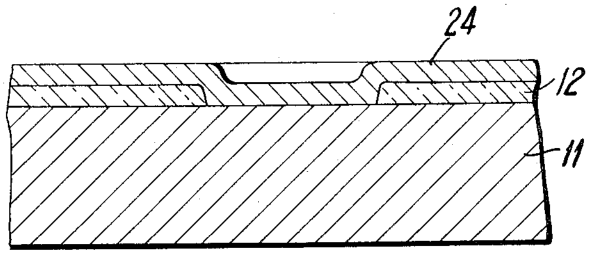
FIGS. 7 to 10 are schematic cross-sectional views which serve to illustrate the steps according to the process of an alternate embodiment of the present invention.
Figure 8:
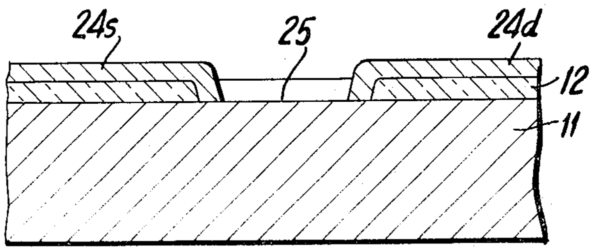
Figure 9:
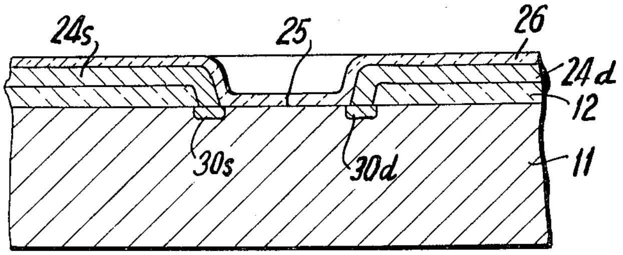
Figure 10:
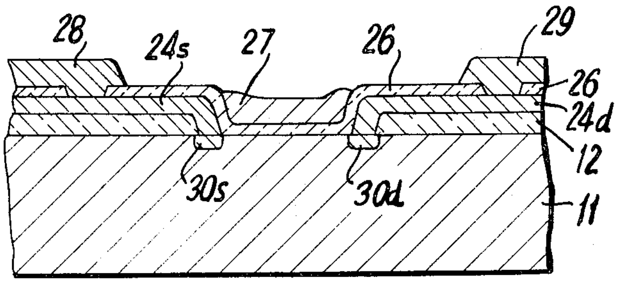

Referring to FIG. 7, a p-type polycrystalline silicon layer 24 doped with boron is deposited over an n-type silicon substrate 11 having a silicon oxide film 12 formed on its surface as in FIG. 2. The deposition of the silicon layer is effected by the thermal decomposition of silane at a low temperature of less than about 900° C. for example at approximately 850° C. In FIG. 8, a part of the polycrystalline silicon layer 24 is selectively etched away by use of a mixed solution of fluoric acid and nitric acid to expose the surface of the intended gate area 25 and to leave a source electrode portion 24_s_ and a drain electrode 24_d_. In FIG. 9, the substrate is heated at a temperature of between 1100° C. and 1200° C. in an oxidizing atmosphere, resulting in the growth of a silicon oxide film 26 on the gate area 25 and on the portions 24_s_ and 24_d_ of the polycrystalline silicon layer. A part of the grown oxide film 26 on the gate area 25 serves as a gate insulator and that on the polycrystalline source and drain electrode portions 24_s_ and 24_d_ acts to insulate the source and drain electrodes from the gate electrode. At the same time of the growth of the oxide film 26, boron diffuse from the polycrystalline source and drain electrode portions 24_s_ and 24_d_ into the n-type silicon substrate 11 to form p-type source and drain regions 30_s_ and 30_d_, respectively. In FIG. 10, a gate electrode 27 is attached on the gate insulator part of the oxide film 26 and lead-out electrodes 28 and 29 are connected to the source and drain electrodes 24_s_ and 24_d_, respectively.

Figure 11:
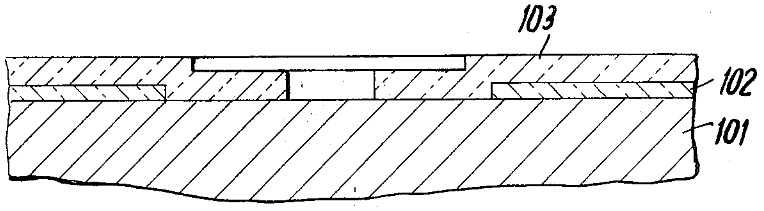
(PRIOR ART) FIG. 11
FIGS. 11 to 13 are schematic cross-sectional views which serve to illustrate a prior method of fabricating an IGFET.
Figure 12:
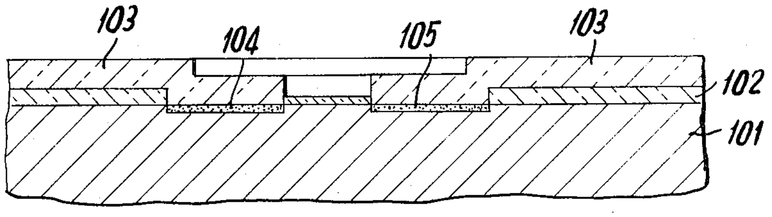
(PRIOR ART) FIG. 12
Figure 13:
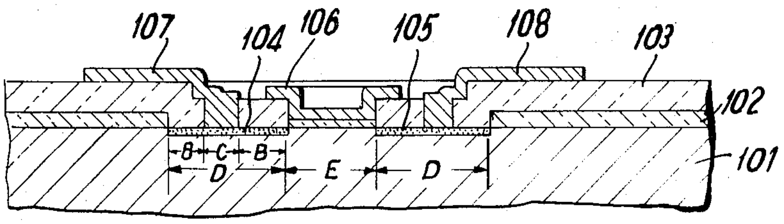
(PRIOR ART) FIG. 13

FIGS. 11 to 13 shows a prior method of the type disclosed in U.S. Pat. No. 3,528,168, particularly in FIGS. 8 to 10 thereof. In this prior method, source and drain regions 104 and 105 are formed by impurity diffusion from an impurity-doped oxide film 103 into the semiconductor substrate 101 partially covered with an insulating film 102, and source and drain electrodes 107 and 108 are provided through the respective apertures formed in the oxide film 103. Gate electrode 106 is also provided on a gate insulating film. Referring to FIG. 13, the width C of the area of contact between the source or drain electrode 107, 108 with the source or drain region 104, 105, respectively, cannot be reduced to less than 10 microns in order to secure adequate ohmic contact between the source and drain electrodes and drain and source regions through the thick oxide film 103. Whereas, the width 2B of the extra, that is, unconnected area of the source or drain region 104, 105 cannot be made less than 6 microns in view of the tolerances in the masking and etching processes to open the aperture and to form the source or drain electrode 107, 108 Therefore, the width D of the. source or drain region 104, 105 of the prior art IGFET is at least 16 microns Since the width E of the gate area is typically 12.5 microns, the minimum practical size of the prior IGFET becomes 44.5 microns.

On the other hand, the width D′ of the source or drain region 14_s_, 14_d_ fabricated according to the present invention shown in FIG. 6 can be made less than microns. Therefore, the size $2D'+E$ of the IGFET, including the source, drain, and gate regions, as well as the electrical contacts to the source and drain regions, can be made as small as 16.5 microns. As is apparent from the fact that the ratio of D′ to D is ⅛ high frequency performances of the IGFET fabricated according to the invention can be remarkably improved. Furthermore, the size of the IGFET is reduced to about ⅓ that of the IGFET's that can be realized by the prior art, and hence three times the number of IGFET's can be integrated in a unit chip where the IGFET's of the invention are used in an integrated circuit.

We claim:

1. A method of producing an insulated-gate field-effect transistor comprising the steps of covering one major surface of a semiconductor substrate of one conductivity type with a first insulating film, forming a window in said first insulating film to expose a part of said surface of the semiconductor substrate at the intended source, gate and drain regions of the transistor, depositing at the same time a single-crystalline semiconductor layer of the opposite conductivity type on the exposed surface of said substrate and a polycrystalline semiconductor layer of the opposite conductivity type on the surface of said first insulating film, selectively removing a portion of said single-crystalline semiconductor layer to expose a part of said surface of said substrate at the intended gate region of the transistor but leaving first and second parts of said single-crystalline semiconductor layer and respectively constituting the source and drain regions of the transistor, selectively removing a portion of said polycrystalline semiconductor layer to leave first and second parts respectively connected to said source and drain regions and respectively constituting electrodes for said source and drain regions, forming a second insulating film at least on the remaining parts of said single- and polycrystalline semiconductor layers and on the secondly exposed surface of said substrate, and forming a gate electrode on a part of said second insulating film above said secondly exposed surface of said substrate.

2. The method as defined in claim 1, in which said single- and polycrystalline semiconductor layers are comprised of silicon and are deposited by the thermal decomposition of silane at a temperature exceeding about 900° C.

3. A method of producing an insulated-gate field-effect transistor comprising the steps of covering one major surface of a semiconductor substrate of one conductivity type with a first insulating film, forming a window in said first insulating film to expose a part of said major surface of said substrate at the intended source, gate, and drain regions of the transistor, depositing a polycrystalline semiconductor layer doped with an impurity of the opposite conductivity type over the exposed surface of said substrate and over the surface of said first insulating film, selectively removing said polycrystalline semiconductor layer to expose a part of said major surface of said substrate at the intended gate region of the transistor and to leave first and second parts of said polycrystalline semiconductor layer which are separated from one another and respectively have one end contacting said major surface of said substrate, and heating said substrate to thermally oxidize the surface of the remaining parts of said polycrystalline semiconductor layer and the exposed surface of said substrate and at the same time to diffuse said impurity of the opposite conductivity type from said one end of said first and second parts of said polycrystalline semiconductor layer into said substrate, to thereby respectively form the source and drain regions of the transistor.

4. The method as defined in claim 3, in which said polycrystalline semiconductor layer is comprised of silicon and is deposited by the thermal decomposition of silane at a temperature below about 900° C.

References Cited

UNITED STATES PATENTS

| | | | |
|---|---|---|---|
| 3,604,107 | 9/1971 | Fassett | 148—187 X |
| 3,600,651 | 8/1971 | Duncan | 317—235 B |
| 3,558,374 | 1/1971 | Boss et al. | 148—187 X |

GEORGE T. OZAKI, Primary Examiner

U.S. Cl. X.R.

148—187, 175; 29—571; 317—235 R